United States Patent
Bork et al.

(10) Patent No.: US 12,420,716 B2
(45) Date of Patent: Sep. 23, 2025

(54) VEHICLE CONSOLE SYSTEM AND MOTOR VEHICLE

(71) Applicant: Volkswagen Aktiengesellschaft, Wolfsburg (DE)

(72) Inventors: Simon Bork, Calberlah (DE); Janna Hahn, Lehre (DE); Stephan Hartmann, Magdeburg (DE); Frank Schur, Biederitz (DE); René Goergens, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 601 days.

(21) Appl. No.: 17/722,072

(22) Filed: Apr. 15, 2022

(65) Prior Publication Data

US 2022/0242323 A1 Aug. 4, 2022

Related U.S. Application Data

(63) Continuation of application No. PCT/EP2020/078655, filed on Oct. 12, 2020.

(30) Foreign Application Priority Data

Oct. 17, 2019 (DE) ...................... 10 2019 215 985.0

(51) Int. Cl.
  *B60R 7/04* (2006.01)
  *B60N 2/02* (2006.01)
  (Continued)

(52) U.S. Cl.
  CPC .............. *B60R 7/04* (2013.01); *B60N 2/0244* (2013.01); *B60N 2/0264* (2023.08); *B60N 2/773* (2018.02);
  (Continued)

(58) Field of Classification Search
  CPC ............... B60R 7/04; B60R 2011/0007; B60R 2011/008; B60R 2021/23161;
  (Continued)

(56) References Cited

U.S. PATENT DOCUMENTS

| 6,203,088 B1* | 3/2001 | Fernandez | ............. B60N 2/773 |
| | | | 297/411.21 |
| 7,014,241 B2* | 3/2006 | Toyota | ................... B60N 2/793 |
| | | | 297/188.1 |

(Continued)

FOREIGN PATENT DOCUMENTS

| DE | 19644219 C1 | 11/1997 |
| DE | 102013216549 B3 | 8/2014 |

(Continued)

OTHER PUBLICATIONS

International Search Report dated Jan. 14, 2021 in corresponding application PCT/EP2020/078655.

(Continued)

*Primary Examiner* — Daniel J Colilla
(74) *Attorney, Agent, or Firm* — Muncy, Geissler, Olds & Lowe, P.C (57) ABSTRACT

A vehicle console system having at least one vehicle seat and/or vehicle table console, as at least one vehicle console. At least one attachment device corresponds to at least one locking element in order to attach the at least one vehicle console to the attachment device. The attachment device has two attachment regions to which the at least one vehicle console is locked via the at least one locking element, and wherein the attachment device has, at an electrically contacted attachment region of the two attachment regions, an at least second electrical contact surface corresponding to the first electrical contact surface; and a control unit that is electrically connected to the at least one second electrical contact surface and is equipped to sense the electrical (Continued)

contact between the at least one first electrical contact surface and the at least second electrical contact surface and to issue a command.

8 Claims, 7 Drawing Sheets

(51) Int. Cl.
  *B60N 2/75* (2018.01)
  *B60R 11/00* (2006.01)
(52) U.S. Cl.
  CPC ............ *B60N 2/793* (2018.02); *B60N 2/0272* (2023.08); *B60R 2011/0007* (2013.01); *B60R 2011/008* (2013.01)
(58) Field of Classification Search
  CPC ........ B60R 16/02; B60N 2/773; B60N 2/793; B60N 2/0272; B60N 2/0264; B60N 2/01; B60N 2/753; B60N 3/002; B60N 2/0244; B60N 2/763
  USPC ................... 296/24.34, 37.15, 37.8; 224/275
  See application file for complete search history.

(56) References Cited

U.S. PATENT DOCUMENTS

| | | | |
|---|---|---|---|
| 8,590,958 B2* | 11/2013 | Endt | B60N 2/0745 |
| | | | 296/65.13 |
| 8,870,255 B2* | 10/2014 | Mildner | B60R 7/04 |
| | | | 296/37.1 |
| 10,479,228 B2 | 11/2019 | Esslinger et al. | |
| 11,192,470 B2 | 12/2021 | Bork et al. | |
| 2002/0139824 A1* | 10/2002 | Panhelleux | B60R 11/00 |
| | | | 224/275 |
| 2003/0234550 A1* | 12/2003 | Brooks | B60N 2/793 |
| | | | 296/24.46 |
| 2004/0008036 A1 | 1/2004 | Schirmer et al. | |
| 2004/0251723 A1 | 12/2004 | Endo et al. | |
| 2005/0150705 A1 | 7/2005 | Vincent et al. | |
| 2007/0000959 A1* | 1/2007 | Perin | B60R 7/04 |
| | | | 108/44 |
| 2019/0315303 A1* | 10/2019 | Kia | B60R 21/215 |
| 2020/0156553 A1* | 5/2020 | Kang | B60N 2/14 |
| 2020/0262367 A1* | 8/2020 | Fernández Bañares | |
| | | | B60R 16/03 |
| 2020/0369225 A1* | 11/2020 | Kominato | B60R 16/023 |
| 2022/0153202 A1* | 5/2022 | Beyersdorfer | B60R 7/06 |
| 2023/0136911 A1* | 5/2023 | Nukui | B60N 2/763 |
| | | | 296/24.34 |

FOREIGN PATENT DOCUMENTS

| | | | |
|---|---|---|---|
| DE | 102014013955 A1 * | 3/2016 | ............. B60N 2/06 |
| DE | 102016213444 A1 | 1/2017 | |
| DE | 102016202158 A1 | 8/2017 | |
| DE | 102018100273 A1 | 7/2019 | |
| DE | 102018122669 B3 * | 2/2020 | ............. B60N 2/753 |
| EP | 0847892 A2 | 6/1998 | |
| JP | 07164930 A | 6/1995 | |
| WO | WO2006108954 A2 | 10/2006 | |
| WO | WO2018210905 | 11/2018 | |
| WO | WO-2020058143 A1 * | 3/2020 | ............. B60N 2/753 |

OTHER PUBLICATIONS

Chinese Office Action dated Jul. 24, 2024 in corresponding application 202080073395.1.

\* cited by examiner

VEHICLE CONSOLE SYSTEM AND MOTOR VEHICLE

This nonprovisional application is a continuation of International Application No. PCT/EP2020/078655, which was filed on Oct. 12, 2020, and which claims priority to German Patent Application No. 10 2019 215 985.0, which was filed in Germany on Oct. 17, 2019, and which are both herein incorporated by reference.

BACKGROUND OF THE INVENTION

Field of the Invention

The present invention relates to a vehicle console system having, as a vehicle console for an interior of a motor vehicle, a vehicle seat and/or a vehicle table console, and also relates to a motor vehicle.

Description of the Background Art

DE 10 2013 216 549 B3 describes a vehicle seat with position detection. The vehicle seat is guided in lower rails by means of upper rails. A detection unit is mounted so as to be stationary with respect to the lower rails. The detection unit emits electromagnetic waves that are received by transponders arranged on the vehicle seat for position detection.

US 2004/0008036 A1 describes a system for the wireless transmission of information or energy between a removable vehicle seat and the vehicle body. An inductive transformer has a primary side on the vehicle body and a secondary side in the vehicle seat. Components known for measuring an inductance are arranged on the primary side to detect the removable vehicle seat.

EP 0 847 892 A2 describes a vehicle seat detection system with a pair of mounting rails that can be attached to a floor of a motor vehicle. The mounting rails are arranged to be spaced apart from one another and parallel to one another. A seat detection switch is connected to at least one of the mounting rails. The seat detection switch is normally open, but can be moved into a closed position when the vehicle seat is attached to the mounting rails, however. A monitoring circuit monitors the status of the seat detection switch.

WO 2006/108954 A2 describes a position detection system of removable seats in a vehicle. Each of the seats is furnished with wireless communication for communicating with a communication unit in the vehicle.

WO 2018/210905 A1, which corresponds to US 2020/0079243, which is incorporated herein by reference, describes a vehicle device system for a motor vehicle, having at least one vehicle device, in particular a vehicle seat or vehicle table, and having a mount that is or can be attached to a vehicle body for detachably locking the vehicle device to the motor vehicle body.

SUMMARY OF THE INVENTION

It is therefore an object of the present invention to reduce disadvantages in detection systems for vehicles known from the prior art, in particular to provide a vehicle console system and a motor vehicle that permit an economical, simple, and reliable detection of vehicle consoles.

Features and details that are described in connection with the vehicle console system according to the invention also apply in connection with the motor vehicle according to the invention and vice versa, so mutual reference is or can always be made with regard to the disclosure of the individual aspects of the invention.

According to a first aspect of the invention, the initially stated object is attained by a vehicle console system for an interior of a motor vehicle, wherein the vehicle console system has: (a) at least one vehicle seat, and/or vehicle table console, as at least one vehicle console, wherein the at least one vehicle console has at least one locking element and at least one first electrical contact surface, (b) at least one attachment device that is designed to correspond to the at least one locking element in order to attach the at least one vehicle console to the attachment device, wherein the attachment device has two attachment regions to which the at least one vehicle console can be locked by means of the at least one locking element, and the attachment device has, at an electrically contacted attachment region of the two attachment regions, an at least one second electrical contact surface corresponding to the first electrical contact surface, and (c) a control unit that is electrically connected to the at least one second electrical contact surface and is equipped to sense the electrical contact between the at least one first electrical contact surface and the at least one second electrical contact surface and to issue a command.

Accordingly, a sensing of a vehicle console in one of the at least two attachment regions, namely in the electrically contacted attachment region, by means of an electrical contact between the at least one first electrical contact surface and the at least one second electrical contact surface is carried out by the control unit, which thereupon issues a command in order to respond appropriately to the sensing or to afford the driver the opportunity to respond. Wireless detection systems, such as are known from the prior art, can be intentionally dispensed with in this case, and the already existing structure of the vehicle consoles and attachment device can be utilized, by which means an especially economical and reliable vehicle console system is provided.

The attachment device can have at least two guide rails and the at least one vehicle console has at least two guide elements that are each guided in one of the at least two guide rails. The vehicle console can be guided and moved nearly continuously along the guide rails.

Furthermore, it is preferred that the at least one first electrical contact surface is arranged on at least one extensible contact element inside one of the at least two guide elements, and the second electrical contact surface is arranged on at least one of the at least two guide rails, wherein the extensible contact element is designed such that the extensible contact element extends, during locking to the electrically contacted attachment region, from a protected position inside the guide element into an electrically contacting position in which the at least one first electrical contact surface and the at least one second electrical contact surface make electrical contact. The extensible contact element can, in particular, be a rotatable contact element that can be rotated out of the protected position inside the guide element into the electrically contacting position. The extensible contact element can, for example, be mechanically coupled to the at least one locking element and be extended by the locking process. In the protected position, the at least one second electrical contact surface is protected from mechanical stress when the guide element travels along its guide rail. In the electrically contacting position, in contrast, electrical contact is made to the at least one first electrical contact surface.

Moreover, the at least one vehicle console can have four guide elements, wherein two extensible contact elements with first electrical contact surfaces are arranged inside two diagonally opposite guide elements and each of the two guide rails has a second electrical contact surface, wherein the second electrical contact surfaces are offset from one another along the guide rails. Owing to the provision of two guide elements apiece on each one of the guide rails, an economical and stable guidance is possible that at the same time creates space between the guide elements for the locking elements. Owing to the arrangement as diagonally opposite first electrical contact surfaces and the offset of the second electrical contact surfaces along the guide rails, it is possible for the vehicle console to always be reliably detected with low effort, regardless of its direction of installation. It is also possible, however, for a symmetrical construction to be used. In this case, the first contact surfaces and second contact surfaces are each located opposite one another.

In addition, the at least one first electrical contact surface can be connected to a resistor network in which a switch is incorporated that is equipped to be opened or closed when a function of the vehicle console is triggered. Not only a detection of the position of the vehicle console, but also of a function, is made possible by this means.

The at least one first electrical contact surface can be connected to a console controller that is furnished with a wireless communication unit and is equipped to exchange one or more signals with the control unit when a function of the vehicle console is triggered. Not only a detection of the position of the vehicle console, but also of a function, is made possible by this means, as well.

The function can be a folding up or folding down of an armrest in a vehicle console designed as a vehicle seat, a raising or lowering of a vehicle console designed as a vehicle table console, and/or a pulling out or unfolding of a tabletop or of a table drawer in a vehicle console designed as a vehicle table console. The triggering of the function thus leads to a change in the state of the vehicle seat or vehicle table console. Such a state change can, in particular, have the effect that an airbag, in particular a so-called center airbag in a vehicle seat, could potentially no longer function correctly in an accident under unfavorable circumstances, since the airbag could be blocked by the armrest, the vehicle table console, the tabletop, and/or the table drawer. When the control unit detects the position of the relevant vehicle console in the electrically contacted attachment region together with the function, a corresponding command can be issued by the control unit that alerts the driver to this, in particular prompts the driver to change the state that has been brought about, which is to say, for example, to fold down the armrest, to lower the vehicle table console, and/or to push in or to fold together the tabletop or the table drawer.

Additionally, the control unit can be equipped to issue as a command an operation of a seat heater in the vehicle console designed as a vehicle seat by supplying current to the at least one second electrical contact surface. This makes it possible that the current necessary for operating the seat heater need not be supplied constantly to a current-carrying attachment device, in particular the guide rails, in order to provide a seat heating function in the removable vehicle seat. Doing so is problematic in the case of high currents, such as are necessary for vehicle seats with leather upholstery, in particular, since the attachment device can get wet and this could result in a short circuit under unfavorable circumstances in the case of constantly flowing high currents. With the detection according to the invention of the vehicle seat in the electrically contacted attachment region, in contrast, it is possible to carry the increased current only when electrical contact is sensed and it is therefore determined that the vehicle seat is in the installed position.

Furthermore, the invention attains the initially mentioned object by a motor vehicle having a vehicle console system according to the invention.

The electrically contacted attachment region can be located between a driver's seat and a front passenger seat, wherein the at least one vehicle console of the vehicle console system is designed as a vehicle table console, and the control unit is equipped to issue as a command a displaying of a state of the vehicle table console on a display of the motor vehicle. The state of the vehicle table console is triggered or changed by the function. The vehicle table console between the driver's seat and the front passenger seat represents a possible problem during driving on account of the center airbag installed there, and can, according to the invention, be monitored as to its state with simple means. The safety of the occupants of the motor vehicle is improved still further by this means.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
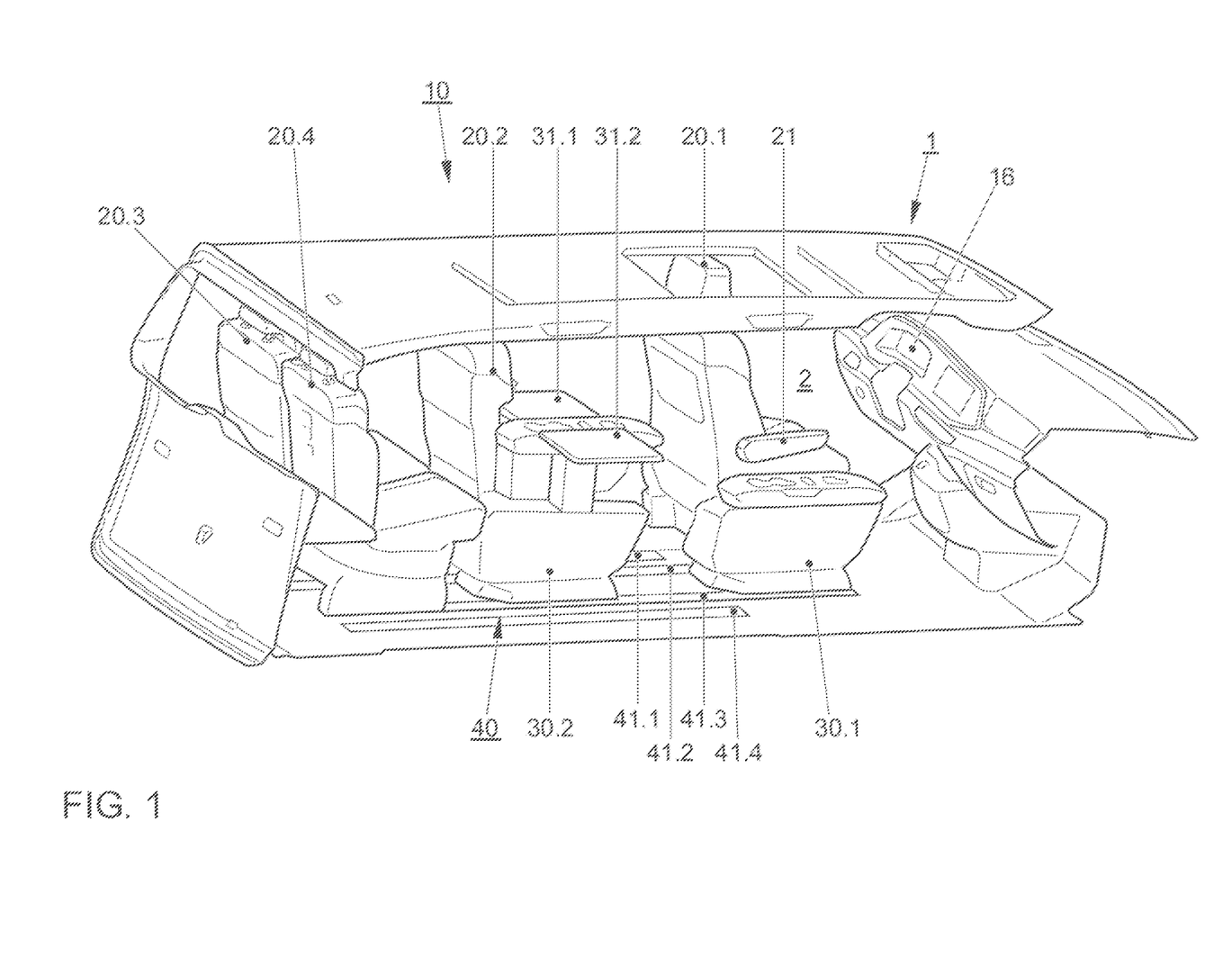
FIG. 1 is a perspective and sectional side view in an interior of an exemplary embodiment of a motor vehicle according to the invention with a vehicle console system according to an exemplary embodiment of the invention.

FIG. 1 shows a perspective side view in an interior 2 of an exemplary embodiment of a motor vehicle 1 according to the invention with a vehicle console system 10 according to an exemplary embodiment of the invention. The vehicle console system 10 has an attachment device 40, which is arranged in the interior 2 on a vehicle floor of the motor vehicle 1. The motor vehicle seats 20.1, 20.2, 20.3, 20.4 that are shown are attached to this attachment device 40 in a first, a second, and a third row. For this purpose, the attachment device 40 has multiple guide rails 41, of which only the guide rails 41.1, 41.2, 41.3, 41.4 are shown. Each of the motor vehicle seats 20.1, 20.2, 20.3, 20.4 is attached to two of the guide rails 41. In addition, the vehicle console system 10 has two vehicle table consoles 30.1, 30.2, which are attached to the guide rails 41.2, 41.3. The motor vehicle seats 20.2, 20.3, 20.4 and the vehicle table consoles 30.1, 30.2 are removable from the guide rails 41.1, 41.2, 41.3, 41.4 and consequently from the interior 2, and otherwise are movable along the guide rails 41.1, 41.2, 41.3, 41.4.

The side view is sectioned along the length of the motor vehicle 1 and does not show the additional motor vehicle seats 20 that are arranged next to the depicted motor vehicle seats 20.1, 20.2, 20.4, nor does it show an additional guide rail 41 next to the guide rail 41.4, to which these additional vehicle seats 20 are attached. Furthermore, an additional guide rail 41, to which the vehicle seats 20.1, 20.2, 20.3 are attached, is not visible from this perspective.

The motor vehicle seat 20.1 positioned as the driver's seat offers a view of a display 16, which can also display the speedometer and other information about the motor vehicle 1 or can be arranged next to these.

Figure 2:
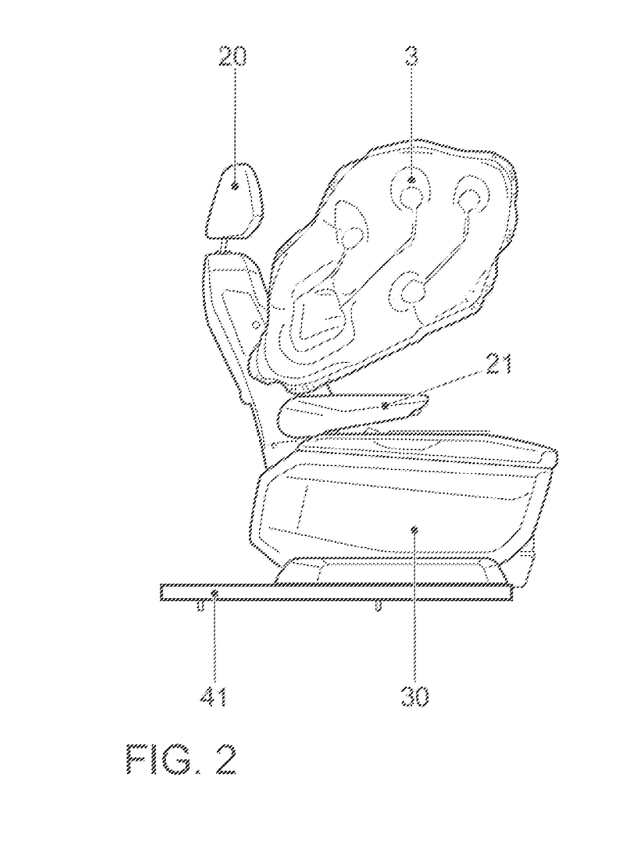
FIG. 2 is a side view of a detail of the vehicle console system from FIG. 1, in which an airbag has been triggered.

FIG. 2 shows a side view of a detail of the vehicle console system from FIG. 1, in which an airbag 3 has been triggered as a result of an accident. The airbag 3 is a so-called center airbag in the vehicle seat 20. In this state of the vehicle seat 20 and vehicle table console 30, the airbag 3 functioned properly, since it could inflate freely and could protect a passenger on the vehicle seat 20.

Figure 3:
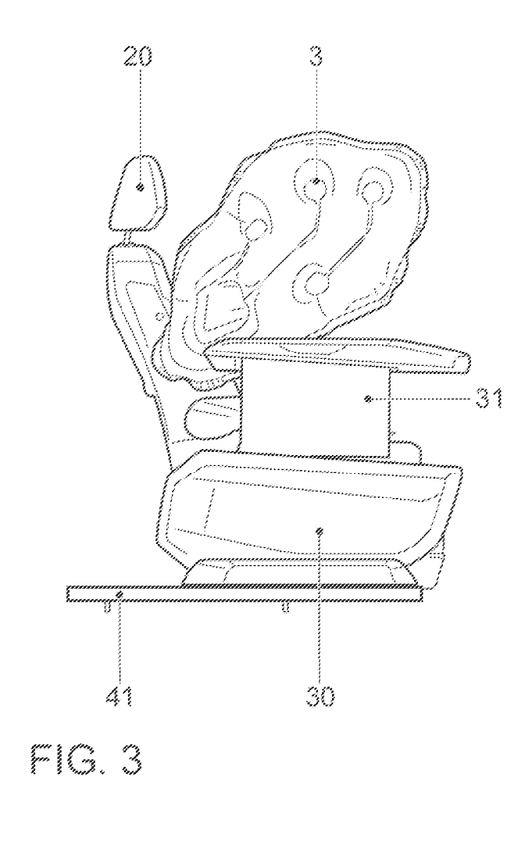
FIG. 3 is the side view of FIG. 2 with a difference that a vehicle table console is raised.

FIG. 3 shows the side view from FIG. 2 with the difference that the vehicle table console 30 is raised. Visible on the vehicle table console 30 in this case is the additionally extensible tabletop 31. On account of the raised vehicle table console 30, a collision between the airbag 3 and the vehicle table console 30 occurs in the event of an accident—unlike in the state of the vehicle table console 30 from FIG. 2. The airbag 3 could fail to function properly under unfavorable circumstances. In this example case, the driver of the motor vehicle 1 should be alerted to the problem of the raised vehicle table console 30 before starting the trip. For this to occur, the position of the vehicle table console 30 next to the vehicle seat 20 and the state of the vehicle table console 30 as raised must be detected.

Figure 4:
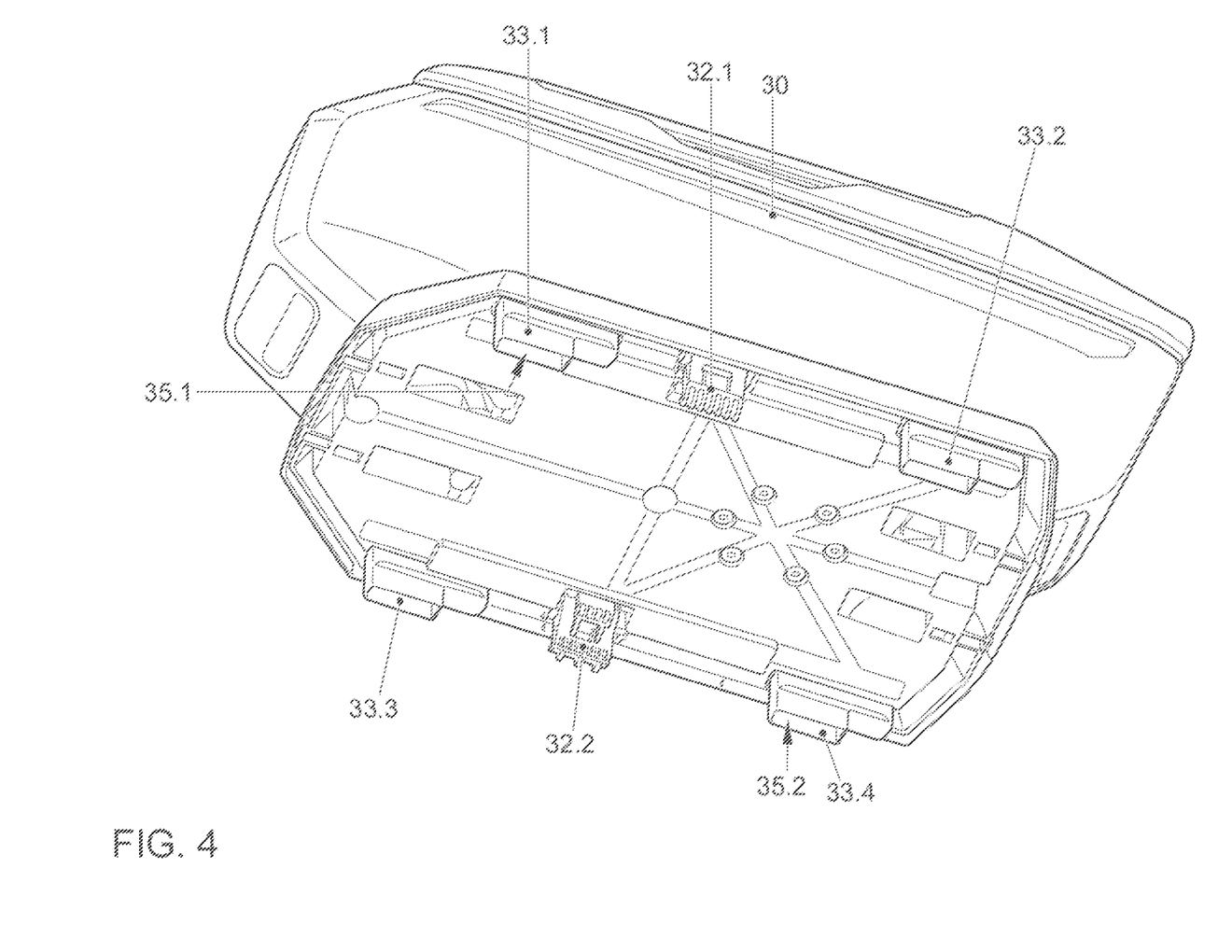
FIG. 4 is a perspective bottom view of the vehicle table console from FIG. 1.

FIG. 4 shows a perspective bottom view of the vehicle table console 30 from FIG. 1. The vehicle table console 30 has, on its underside, a first and a second guide element 33.1, 33.2 and a first locking element 32.1 between the first and second guide elements 33.1, 33.2. Furthermore, the vehicle table console 30 has, on its underside, a third and a fourth guide element 33.3, 33.4 and a second locking element 32.2 between the third and fourth guide elements 33.3, 33.4. The first and second guide elements 33.1, 33.2 can be guided in a first of the guide rails 41 and the third and fourth guide elements 33.3, 33.4 can be guided in a second guide rail 41 parallel to this first guide rail 41. The locking elements 32.1, 32.2 are designed in the form of claws in the present case. These permit a locking of the vehicle table console 30 in attachment regions of the guide rails 41.

Indicated in FIG. 4 are first electrical contact surfaces 35.1, 35.2, of which one is located inside the first guide element 33.1 and one inside the fourth guide element 33.4. The first electrical contact surfaces 35.1, 35.2 thus lie diagonally across from one another relative to the extent of the vehicle table console 30. This makes it possible to provide just a few first electrical contact surfaces 35 by means of which an electrical contact can be established through contact with corresponding second electrical contact surfaces 42 on the guide rails 41 in order to detect a position of the vehicle table console 30. In this case, the vehicle table console 30 can be attached regardless of a direction along which the vehicle table console 30 is attached to the guide rails 41, and its position can nonetheless be reliably detected.

Figure 5:
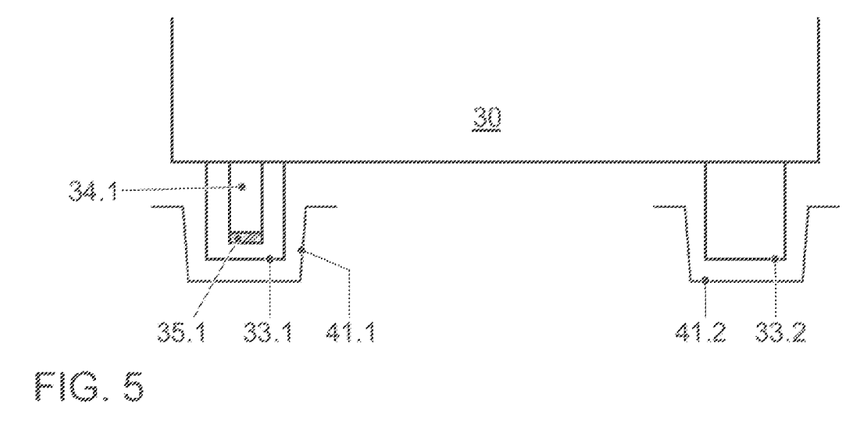
FIG. 5 is a schematic cross-sectional view through a section of the vehicle console system from FIG. 1.

FIG. 5 shows a schematic cross-sectional view through a section of the vehicle console system 10 from FIG. 1. Evident in this depiction is the first electrical contact surface 35.1, which is formed on an extensible contact element 34.1, designed here as a rotatable contact element 34.1, inside the guide element 33.1. The first electrical contact surface 35.1 in this case is located in a protected position inside the guide element 33.1 so that it is protected from mechanical stress when the guide element 33.1 is moved along the guide rails 41.1.

Figure 6:
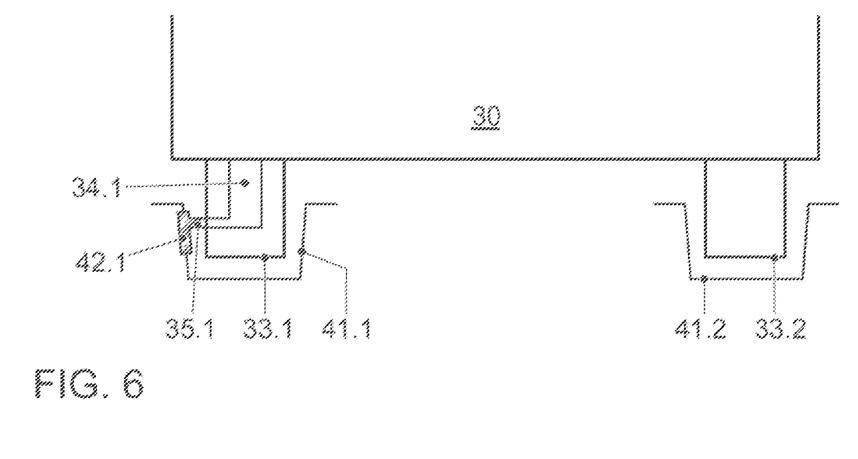
FIG. 6 is the schematic cross-sectional view of FIG. 5 with the difference that extensible contact elements have been extended.

FIG. 6 shows the schematic cross-sectional view from FIG. 5 with the difference that the extensible contact element 34.1 has been rotated. Compared with FIG. 5, the guide elements 33.1, 33.2 have been moved to an electrically contacted attachment region of the guide rails 41.1, 41.2, in which the second electrical contact surface 42.1 is arranged on an inner side of the guide rail 41.1, so that the rotatable contact element 34.1, 34.2 has been rotated for the purpose of electrical contact between the first electrical contact surfaces 35.1 and it.

Figure 7:
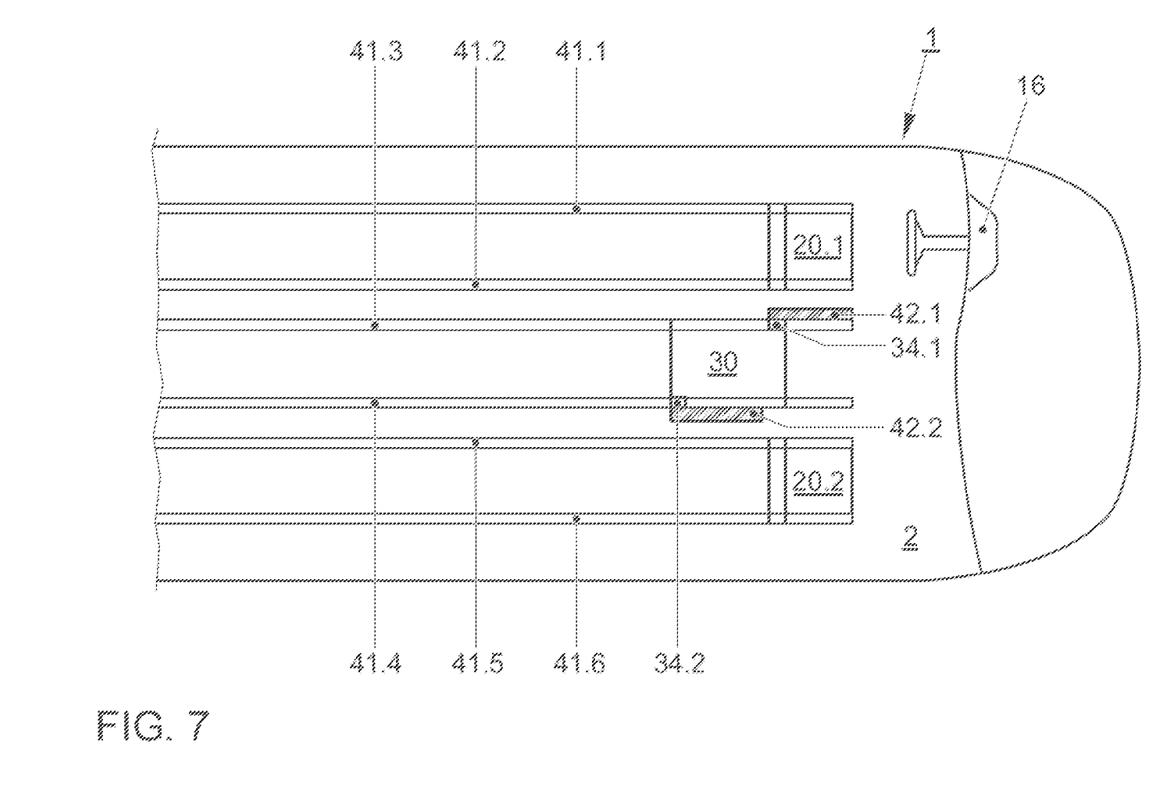
FIG. 7 is a schematic top view of the interior of the motor vehicle from FIG. 1.

FIG. 7 shows a schematic top view of the interior 2 of the motor vehicle 1 from FIG. 1 and the electrical contact from FIG. 6. In all, six guide rails 41.1, 41.2, 41.3, 41.4, 41.5, 41.6 are arranged on the motor vehicle 1. The driver's seat 20.1 is attached to the guide rails 41.1, 41.2. The front passenger seat 20.2 is attached to the guide rails 41.5, 41.6. Arranged along the guide rails 41.3, 41.4 are the mutually offset second electrical contact surfaces 42.1, 42.2, which, in the position shown, are contacted by the first electrical contact surfaces 35.1, 35.2 on the rotatable contact elements 34.1, 34.2 of the vehicle table console 30. As a result of the current flowing between the first electrical contact surfaces 35.1, 35.2 and the second electrical contact surfaces 42.1, 42.2, the vehicle table console 30 between the driver's seat 20.1 and the front passenger seat 20.2 is detected.

Figure 8:
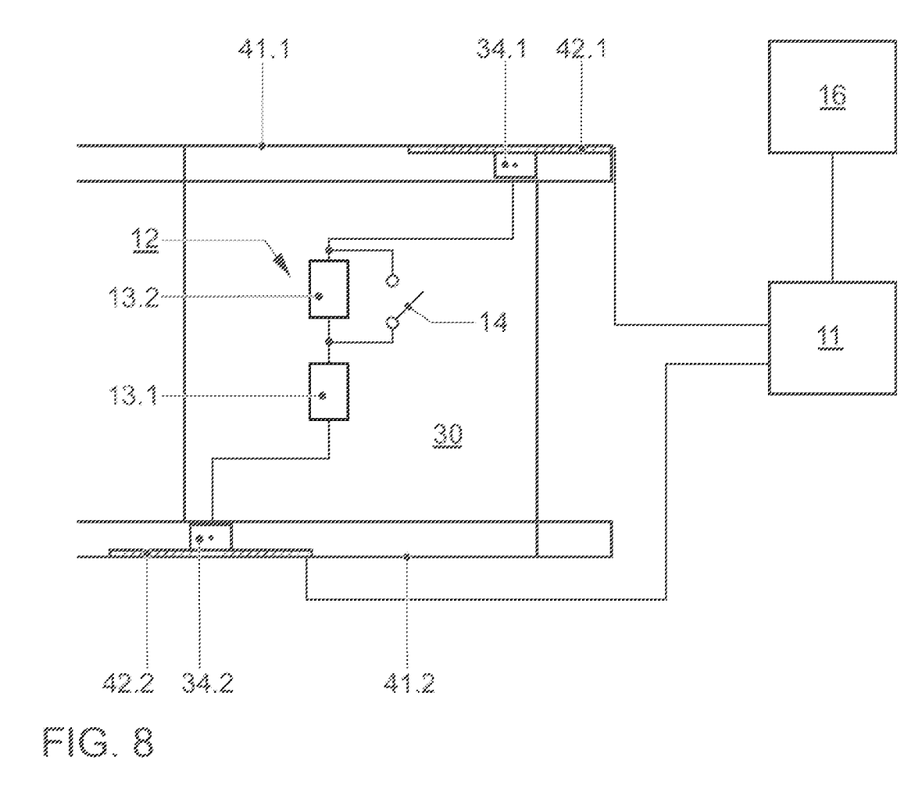
FIG. 8 is a schematic view of the electrical contact to the vehicle table console of the vehicle console system from FIG. 6 and according to a first exemplary embodiment.

FIG. 8 shows a schematic view of the electrical contact to a vehicle table console 30 of the vehicle console system 10 from FIG. 6 and according to a first exemplary embodiment with a resistor network 12. Current flows through the first resistor 13.1 in the resistor network 12 as a result of the electrical contact between the first electrical contact surfaces 35.1, 35.2 and the second electrical contact surfaces 42.1, 42.2, and informs the control unit 11 connected to the second electrical contact surfaces 42.1, 42.2 that the vehicle table console 30 is located in the electrically contacted attachment region. If a function of the vehicle table console 30, such as a raising of the vehicle table console 30, is triggered, the switch 14 is closed and the second resistor 13.2, which is connected in series with the first resistor 13.1, is short-circuited. This change in resistance from the first resistor 13.1 and the second resistor 13.2 to only the first resistor 13.1 is sensed by the control unit 11 and is interpreted as a potential problem with regard to a possible triggering of the airbag 3. The control unit 11 thereupon issues an error message to the display 16 and informs the driver that the vehicle table console 30 should be retracted before starting the trip in order to ensure fault-free functioning of the airbag 3.

Figure 9:
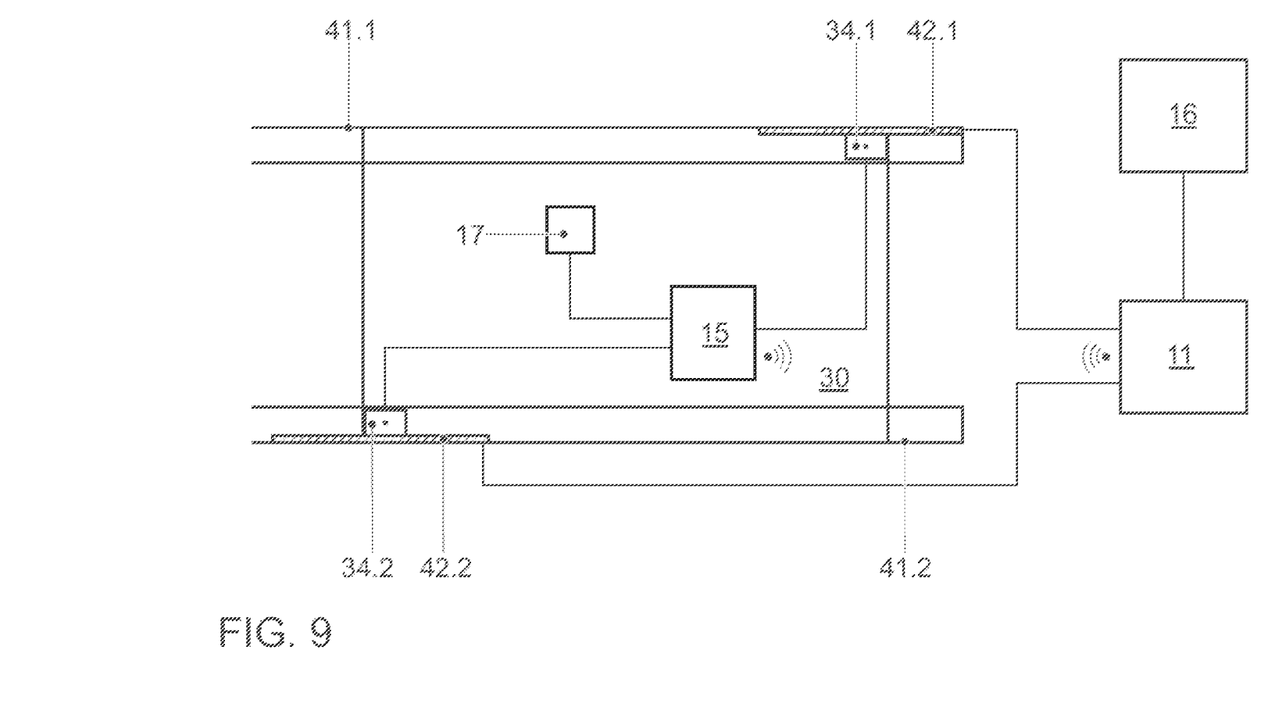
FIG. 9 is a schematic view of the electrical contact to the vehicle table console of the vehicle console system from FIG. 6 and according to a second exemplary embodiment.

FIG. 9 shows a schematic view of the electrical contact to the vehicle table console 30 of the vehicle console system 10 from FIG. 6 and according to a second exemplary embodiment. Unlike the first exemplary embodiment from FIG. 8, no resistor network 12 is arranged in the vehicle table console 30 between the first electrical contact surfaces 35.1, 35.2, but instead a console controller 15. The console controller 15 can sense the states of the vehicle table console 30 and transmit wirelessly to the control unit 11 by means of a wireless communication unit. Furthermore, the console controller 15 can supply a charging socket 17 or other load of the vehicle table console 30 with the current flowing between the first electrical contact surfaces 35.1, 35.2. A bidirectional communication is also possible here, so that the control unit 11 can also transmit control signals or information signals to the console, for example can enable the charging socket or disable the charging socket.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle console system for an interior of a motor vehicle, the vehicle console system comprising:
   at least one vehicle seat and/or vehicle table console as at least one vehicle console, the at least one vehicle console having at least one locking element and at least one first electrical contact surface;
   at least one attachment device configured to correspond to the at least one locking element to attach the at least one vehicle console to the at least one attachment device, the at least one attachment device having two attachment regions to which the at least one vehicle console is adapted to be locked via the at least one locking element, and the at least one attachment device having, at an electrically contacted attachment region of the two attachment regions, at least one second electrical contact surface corresponding to the at least one first electrical contact surface; and
   a control unit that is electrically connected to the at least one second electrical contact surface and is equipped to sense an electrical contact between the at least one first electrical contact surface and the at least one second electrical contact surface and to issue a command,
   wherein the at least one attachment device has at least two guide rails, and wherein the at least one vehicle console has at least two guide elements that are each guided in one of the at least two guide rails, and
   wherein the at least one first electrical contact surface is arranged on at least one extensible contact element that is provided inside one of the at least two guide elements, wherein the at least one second electrical contact surface is arranged on at least one of the at least two guide rails, and wherein the at least one extensible contact element is designed such that the at least one extensible contact element extends during locking to the electrically contacted attachment region, from a protected position inside the one of the at least two guide elements into an electrically contacting position in which the at least one first electrical contact surface and the at least one second electrical contact surface make electrical contact.

2. The vehicle console system according to claim 1, wherein the at least one vehicle console has four of the guide elements, wherein two of the extensible contact elements with the first electrical contact surfaces are arranged inside two diagonally opposite guide elements, wherein each of the two guide rails has a second electrical contact surface, and wherein the second electrical contact surfaces are offset from one another along the guide rails.

3. The vehicle console system according to claim 1, wherein the at least one first electrical contact surface is connected to a console controller that has a wireless communication unit and is equipped to exchange one or more signals with the control unit when a function of the at least one vehicle console is triggered.

4. The vehicle console system according to claim 1, wherein the control unit is equipped to issue, as the command, an operation of a seat heater of the at least one vehicle console designed as the at least one vehicle seat by supplying current to the at least one second electrical contact surface.

5. A motor vehicle comprising the vehicle console system according to claim 1.

6. A vehicle console system for an interior of a motor vehicle, the vehicle console system comprising:
   at least one vehicle seat and/or vehicle table console as at least one vehicle console, the at least one vehicle console having at least one locking element and at least one first electrical contact surface;
   at least one attachment device configured to correspond to the at least one locking element to attach the at least one vehicle console to the at least one attachment device, the at least one attachment device having two attachment regions to which the at least one vehicle console is adapted to be locked via the at least one locking element, and the at least one attachment device having, at an electrically contacted attachment region of the two attachment regions, at least one second electrical contact surface corresponding to the at least one first electrical contact surface; and
   a control unit that is electrically connected to the at least one second electrical contact surface and is equipped to sense an electrical contact between the at least one first electrical contact surface and the at least one second electrical contact surface and to issue a command,
   wherein the at least one first electrical contact surface is connected to a resistor network in which a switch is incorporated that is equipped to be opened or closed when a function of the at least one vehicle console is triggered.

7. The vehicle console system according to claim 6, wherein the function includes:
   a folding up or folding down of an armrest of the at least one vehicle console designed as the at least one vehicle seat,
   a raising or lowering of the at least one vehicle console designed as the vehicle table console, and/or
   a pulling out or unfolding of a tabletop or a table drawer of the at least one vehicle console designed as the vehicle table console.

8. A motor vehicle, comprising:
   a vehicle console system for an interior of the motor vehicle, the vehicle console system comprising:
      at least one vehicle seat and/or vehicle table console as at least one vehicle console, the at least one vehicle console having at least one locking element and at least one first electrical contact surface;

at least one attachment device configured to correspond to the at least one locking element to attach the at least one vehicle console to the at least one attachment device, the at least one attachment device having two attachment regions to which the at least one vehicle console is adapted to be locked via the at least one locking element, and the at least one attachment device having, at an electrically contacted attachment region of the two attachment regions, at least one second electrical contact surface corresponding to the at least one first electrical contact surface; and a control unit that is electrically connected to the at least one second electrical contact surface and is equipped to sense an electrical contact between the at least one first electrical contact surface and the at least one second electrical contact surface and to issue a command, wherein the electrically contacted attachment region is located between a driver's seat and a front passenger seat, wherein the at least one vehicle console of the vehicle console system is designed as the vehicle table console, and the control unit is equipped to issue, as the command, a displaying of a state of the vehicle table console on a display of the motor vehicle.

\* \* \* \* \*